United States Patent Office 2,745,726
Patented May 15, 1956

2,745,726

STABILIZED ORGANIC COMPOSITIONS CONTAINING ALKYLATED BISPHENYL COMPOUNDS

David W. Young and George E. Serniuk, Roselle, and Delmer L. Cottle, Highland Park, N. J., assignors to Esso Research and Engineering Company, a corporation of Delaware No Drawing. Application February 17, 1951, Serial No. 211,582

9 Claims. (Cl. 44—78)

This invention relates to the stabilization of organic compounds which tend to deteriorate in storage or in use due to undesirable oxidation reactions. In accordance with this invention, these organic compounds are stabilized against oxidation by incorporating therein small amounts of novel alkylated bisphenyl derivatives, i. e., alkylated bisphenols and alkylated (4-hydroxy-4'-methoxy) diphenyl alkanes.

Various organic compounds and mixtures, including mineral oils, resins, insecticides, soaps, lubricating oils, waxes, rubbers, polyolefins, such as polyisobutylene, etc., are adversely affected by oxygen, with the resultant formation of undesirable oxidation products, breakdown products, gums and usually discoloration of the organic compounds as well as other deleterious reactions.

Thus, for example, in the oil refining industry, in order to prepare lubricating oils of superior quality, it is generally necessary to stabilize the oil against degradation which normally occurs due to oxidation of the hydrocarbon components. In general, hydrocarbon mixtures falling in the lubricating oil boiling range, if unstabilized, will, over a period of time under certain conditions, be subject to gum formation, sludge formation, the formation of acids and the formation of objectionable color bodies.

It is also known that synthetic rubbers undergo changes due to further polymerization or degradation due to depolymerization on exposure to air and consequently yield on vulcanization inferior products unless there is incorporated therewith at time of synthesis a compound which stabilizes the synthetic rubber by largely preventing oxidation, degradation and/or cyclization of the chain molecules present in the polymer structure. Natural, as well as synthetic, rubbers require an anti-oxidant present in the vulcanizate in order that finished rubber products remain stable toward oxidation and heat during their useful life.

Bisphenols such as 2,2-di-(p-hydroxyphenyl) propane, hereafter referred to simply as diphenylol propane, have been tried previously as anti-oxidants for various hydrocarbon materials such as wax, natural rubber and hydrocarbon polymers of other kinds. However, these compounds proved to be generally inferior to other types of known anti-oxidants and for this reason, their use as anti-oxidants never was commercially adopted by the art. The major difficulty in the use of conventional bisphenols as anti-oxidants has resided in their excessive polarity and consequently limited hydrocarbon solubility and excessive water solubility. The latter characteristic resulted in the bisphenols being lost due to leaching in the presence of water.

It has now been found that particular alkylated bisphenol-type compounds are extremely effective oxidation inhibitors and stabilizers for materials which usually degrade in the presence of air and/or heat. In addition, the compounds of this invention do not suffer from the above-listed disadvantages of the simple bisphenols.

The compounds utilized for the anti-oxidant purposes of this invention are thus largely water-insoluble and oil-soluble, a desirable combination of characteristics.

These compounds, which are believed to be new chemicals and are solid in nature, are thus illustrated in Formula I below:

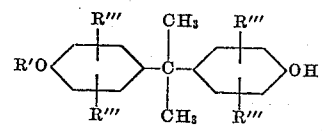

Formula I wherein R' is a radical selected from the group consisting of hydrogen and alkyl radicals having from 1 to 5 carbon atoms, and the R''' symbols represent alkyl radicals having 4 to 22 carbon atoms where the several R''' radicals H₃ can be the same or different.

It is difficult to ascertain the exact linkage of the R''' groups to the aromatic nuclei, but because of the orientation effect of the hydroxyl and OR' group, the R''' groups are believed to be positioned ortho to these latter radicals, or possessed of the following structure:

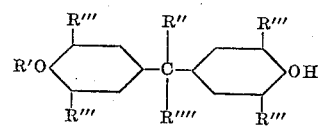

It is preferable to have the latter structure. Particularly effective and desirable compounds of the class of compounds of this invention are 2,2 bis(4-hydroxy,3,5 di t-butyl phenyl) propane and 2,2-(4-methoxy-4'-hydroxy)3',5' di t-butyl diphenyl propane.

It should be noted that the alkoxy or OH group of the alkylated phenyl group occurs para to the alkane linkage. It is this configuration which is believed to impart the desired characteristics to the products of this invention.

In general, the compounds of this invention can be prepared by various procedures starting with the indicated bisphenols. These latter compounds are first prepared by condensing in a known manner two moles of a simple or a chlorine-substituted phenol with one mole of a ketone or aldehyde such as acetone, formaldehyde, methyl ethyl ketone, methyl n-butyl ketone or methyl isobutyl ketone. If the (4-hydroxy-4'-methoxy) diphenyl alkane is to be alkylated, it is first prepared by methods such as by reacting diphenylol propane under heat and pressure with methyl chloride and/or methyl iodide in the presence of compounds like potassium hydroxide and methyl alcohol.

The bisphenyl derivative can be alkylated by several methods. One of the preferred methods involves the use of alkyl halides as the alkylating agent in an excess of the alkyl halide as a solvent. In this method bisphenols may be alkylated with alkyl halides, preferably those of four to ten carbon atoms, in the presence of 1 to 5 wt. percent of aluminum chloride. The temperature of alkylation is about 30 to 80° C. and the time of reaction is from about 1 to 8 hours. Auxiliary solvents such as nitromethane, nitrobenzene, tetrachloroethylene, etc., may be employed. The substituted bisphenyl derivatives may also be alkylated with various olefins, e. g., isobutylene, propylene, amylene, diisobutylene, polypropylene, etc., utilizing catalysts such as BF₃ ether, H₂SO₄, AlCl₃, sulfonic acids, etc., under dry conditions, with agitation, and a temperature of about 50–60° C. with a concentration of catalyst of about 0.1 to 2% by weight, to produce the mono, di, tri and tertiary alkylated products.

The following examples are given to illustrate this invention and include both the preparation of the products of this invention and test results on their use as anti-oxidants.

EXAMPLE I

*Preparation of diphenylol propane alkylated with 2 moles of t-butyl chloride*

One mole of finely powdered diphenylol propane was placed in a three-necked R. B. Pyrex flask fitted with a reflux condenser and agitator. To this product was added 2 moles of dry t-butyl chloride that contained 5 grams of anhydrous AlCl$_3$. The mixture was agitated for 5 hours at the B. P. of the t-butyl chloride. HCl was liberated by this alkylation reaction. The product was well washed with water and then dried. A product, 84% yield based on reactants, distilled predominantly at 219° C. at 4 mm. Hg. This product showed the following analysis: 80.81% carbon, 9.65% hydrogen. It had a melting point of 32° C. and a molecular weight of 324. The product was apparently

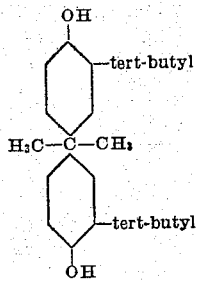

As calculations indicate, this compound has the following characteristics:

81.18% carbon
9.41% hydrogen
340 molecular weight

EXAMPLE II

*Preparation of diphenylol propane alkylated with 4 moles of t-butyl chloride*

One mole of diphenylol propane was alkylated with 4 moles of t-butyl chloride. The alkylation conditions were the same as that given in Example I. Under these conditions the product was obtained in 88% yield. It distilled predominantly at 254° C. at 4 mm. Hg. The molecular weight of the product was 454.

EXAMPLE III

*Preparation of 2,2-(4-methoxy-4'-hydroxy) diphenyl propane alkylated with 4 moles of isobutylene*

One mole of 2,2-(4-methoxy-4'-hydroxy) diphenyl propane was alkylated with 4 moles of isobutylene in the presence of 98% H$_2$SO$_4$ catalyst. To make 2,2-(4-methoxy-4'-hydroxy) diphenyl propane, one mole of diphenylol propane was heated in a steel bomb with one mole of methyl chloride. The solvent for the reaction was one mole of CH$_3$OH and the catalyst was one mole of KOH. The time of reaction was three hours and the temperature was 350° C. The reactants were diluted with 2 moles of heptane. The yield of final water washed, dry, catalyst-free product, which distilled predominantly at 260° C. at 4 mm. Hg, was 88%.

EXAMPLE IV

*Preparation of diphenylol propane alkylated with 4 moles of n-decyl bromide*

One mole of diphenylol propane was dissolved in 350 grams of hot nitromethane. To this solution was added 5 grams of AlCl$_3$. About 5 minutes after the catalyst had been added, 4 moles of n-decyl bromide was added. The alkylation was conducted for 10 hours at the boiling point of the mixture under reflux. After this, the alkylated product was well washed with water, 5% NaHCO$_3$ and then water. Upon drying, all of the product was soluble in mineral oil. This solubility test proved that diphenylol propane was not present in the final product. The yield of soluble product was very high—over 97.5% of theory and no insoluble material could be detected.

EXAMPLE V

In this example the test used to evaluate the products claimed in this invention was the ASTM Oxidation Stability Test designated as ASTM–D–525–46. Essentially, this test consists of placing 50 cc. of the composition in a bomb, after which oxygen is added to provide a pressure of about 100 lbs. p. s. i. g. The bomb is then heated to about 100° C. and the pressure in the bomb determined at 15-minute intervals. When sufficient time has passed so that the pressure drops two lbs. p. s. i. g. in 15 minutes, the test is discontinued and the time required to reach this condition is recorded at the induction period or the ASTM breakdown time and is ordinarily given in minutes. A material subjected to this test which is markedly unstable to oxidation will result in an ASTM breakdown time of about one hour, while an oxidation stable mixture will be characterized by breakdown times of 150 minutes or longer. In the data presented below, 2 lbs. of anti-oxidant were employed per 5,000 gallons of a cracked leaded premium gasoline. The results follow:

| Anti-oxidant | Breakdown Time in Minutes |
|---|---|
| None | 130 |
| Diphenylol propane | 130 |
| Product of Example I | 240 |
| Diphenylol propane alkylated with 3 moles of tertiary butyl chloride | 270 |
| Product of Example II | 454 |
| 2,2-(4-methoxy-4'-hydroxy) diphenyl propane | 130 |
| 2,2-(4-methoxy-4'-hydroxy) 3,5 di t-butyl diphenyl propane | 295 |

These data prove the excellent anti-oxidant effect of the compounds of this invention. It should be particularly noted that an improvement of 125% was obtained when the alkylated compounds of this invention were used as compared to the non-alkylated predecessor compounds.

EXAMPLE VI

The products of this invention were tested for anti-oxidant effectiveness on a rubber-like polymer of a mono-olefin known as Vistanex. The results, including control results, are given below and indicate clearly the excellent anti-oxidant effect of the compounds of this invention, 0.25 wt. percent of anti-oxidant being employed where indicated. The Vistanex, in the form of small pieces, was held on a watch glass in a dark air-circulated oven.

| Percent Anti-oxidant | Original M. Wt. of Vistanex | M. Wt. of Vistanex After 6 Weeks at 110° C. |
|---|---|---|
| 0 | 92,000 | 12,000 |
| 0.25 Wt. percent 2,2 bis(4-hydroxy, 3,5 di t-butyl phenyl propane | 92,000 | 84,000 |

EXAMPLE VII

Some of the products of this invention were evaluated on the ASTM test on diisobutylene. The results follow:

| Name of Anti-oxidant | Amount of Anti-oxidant | ASTM Breakdown, Min. |
|---|---|---|
| Blank | None | 100 |
| 2,6 di t-butyl 4-methyl phenol | 1 lb. per 5,000 gal | 580 |
| 2,2 bis(4-hydroxy, 3,5 di t-butyl phenyl) propane | 1 lb. per 5,000 gal | 690 |

This test shows an almost seven-fold increase on breakdown time through the use of the compounds of this invention and that they were more effective than 2,6 di t-butyl 4-methyl phenol, one of the best known anti-oxidants that has been approved for use in aviation gasoline by the U. S. Army and Navy.

EXAMPLE VIII

The products of this invention were evaluated as anti-oxidants in a mineral oil (43 S. S. U. at 210° F. and 112 V. I.). The results follow:

| Sample No. | Percent Anti-oxidant | Staeger Life,[1] Hrs. |
|---|---|---|
| 2,6 di t-butyl 4-methyl phenol | 0.1 | 420 |
| 2,2 bis (4-hydroxy, 3,5 di t-butyl phenyl) propane | 0.1 | 400 |
| 2,2 bis (4-hydroxy, 3,5 di t-butyl phenyl) propane | 0.25 | 480 |

[1] H. Staeger test-Chemisches Zentralblatt, Part I, vol. 100, p. 594 (1929).

These results indicate that the compounds of this invention are about as good, or better, than 2,6 di t-butyl 4-methyl phenol, one of the best known anti-oxidants.

EXAMPLE IX

The product of Example IV was blended in a Pennsylvania neutral oil. The results are listed below:

| Penn. Neut. | Pour Point, °F. | Cloud, °F. | Kin. Vis. 100° F. | Kin. Vis. 210° F. | S. S. U. at 210 | V. I. | Staeger Life, Hrs. |
|---|---|---|---|---|---|---|---|
| Penn. Neut. | +30 | +32 | 29.8 | 4.99 | 42.57 | 101 | 130 |
| Penn. Neut.+1% of n-Decyl Bromide Alkylated diphenylol propane | −5 | +32 | 29.7 | 4.98 | 42.56 | 101 | 210 |
| Penn. Neut.+2.5% n-Decyl Bromide Alkylated diphenylol propane | −15 | +32 | (¹) | (¹) | (¹) | (¹) | 225 |

¹ Not determined.

These results indicate that the compounds of this invention, in addition to improving the heat stability of the oil, also reduce the pour point, a desirable combination of characteristics.

It is to be seen from the above examples that the compounds of this invention provide markedly effective oxidation inhibition. As a result of these tests, it is contemplated in accordance with this invention that the class of inhibitors indicated can be used to stabilize oxidation unstable mixtures. These alkylated bisphenols are particularly adapted for use with synthetic ester lubes, mineral oils, greases formed from metallic soaps and esters, rubbers, and wax-polymer blends.

It is also proposed that the alkylated anti-oxidants of this invention be employed particularly to stabilize the class of oils known as turbine oils. Turbine oils are highly refined lubricating oils having a range in Saybolt viscosity at 210° F., from about 43 to 145 to which are added suitable anti-oxidants, rust preventers, pour depressants, V. I. improvers, and other additives.

The synthetic rubbers which may be stabilized in accordance with this invention in addition to GR–I (isobutylenediolefin polymer) rubber are the polymers consisting predominantly of a polymerizable conjugated diolefin having 4 to 6 carbon atoms, e. g., 1,3-butadiene, isoprene, 2,3-dimethylbutadiene, 2-chloro-1,3-butadiene, piperylene, 2-methyl-1,3-pentadiene and the like; hence, synthetic rubbers of the above class include polymers of these materials and also copolymers prepared by the polymerization of monomer mixtures comprising a major proportion of such a polymerizable diolefin and also containing a minor proportion of other monoethylenically unsaturated compounds copolymerizable with the diolefin such as acrylonitrile, methyl acrylonitrile, methyl methacrylate, styrene, alpha methyl styrene, vinyl naphthalene, vinyl ketones, vinylidene chloride, diethyl fumarate, vinyl pyridine, and the like. Vulcanized natural rubber is also stabilized by the compounds of this invention.

The incorporation of the alkylated compounds with the synthetic rubber may be carried out simply by adding the compounds either in the pure form or in solution, suspension or emulsion to a water dispersion or a latex containing the synthetic rubber dispersed in an aqueous medium such as is ordinarily obtained by an emulsion polymerization process, or they may added during the milling operation, which is the more convenient way in case of natural rubber and GR-I.

The Vistanex (polyisobutylene synthetic rubber) compositions stabilized by the product of this invention have a Staudinger molecular weight of 40,000 to 300,000.

Mixtures of the compounds of this invention may be employed as well as the $P_2S_5$, chlorine, sulfur, barium, etc., derivatives. Styrene aralkylated compounds, as well as the alkylated compounds, can be employed.

The amount of the indicated ingredients added to the normally oxidizable material in order to prevent oxidation varies with different materials.

In general, the amount that has to be added to the normally oxidizable material represents only a small proportion of the normally oxidizable substance, i. e., 0.0003–5 wt. per cent based on the normally oxidizable material.

Typical formulations are as follows with the weight per cent figure based on the normally oxidizable substance:

Gasoline_____ 0.1 to 5 lbs. present per 5,000 gallons of gasoline (approximately .0003–0.15 wt. per cent).
Lubricating oils_____ 0.02 to 10% by weight.
Rubbers and plastics____ 0.1 to 5% by weight.

The compounds of this invention may be utilized in conjunction with other anti-oxidants in order to obtain desirable combinations of properties. Among the other anti-oxidant materials which may be so employed are phenyl-beta-naphthylamine and other aromatic amines, naphthols, substituted naphthols, substituted phenols, substituted catechols, substituted hydroquinones, alkyl phenol sulfides, ketone-amine condensation products and the like. Due to the fact that the compounds have good color, they may be mixed with 2,6-ditertiary-butyl-4-methyl phenol in rubber or resin compounds to form light colored stocks.

The anti-oxidant compounds of this invention have many advantages among which are their extreme potency, ease of preparation, good color retention, non-staining and odorless character, solubility in hydrocarbons and insolubility in water.

It is to be understood that the invention is not limited to the specific examples which have been offered merely as illustrations, since other derivatives can be prepared, and that modifications may be made without departing from the spirit of the invention.

What is claimed is:

1. As new chemicals, hydrocarbon oil-soluble alkylated bisphenyl type compounds corresponding to the general formula

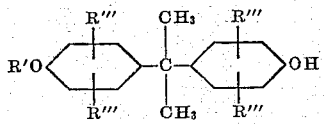

wherein R' is a radical selected from the group consisting of hydrogen and alkyl radicals having from 1 to 5 carbon atoms, and R''' is an alkyl radical having 4 to 22 carbon atoms.

2. As a new chemical, a hydrocarbon oil-soluble bisphenyl compound corresponding to the formula

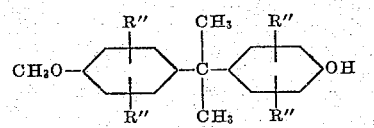

wherein each of the four R'' radicals is an alkyl group having 4 to 22 carbon atoms.

3. A bisphenyl compound according to claim 2 wherein all four R'' radicals are tertiary butyl groups.

4. A composition of matter comprising an organic hydrocarbon material normally subject to oxidative changes containing a minor proportion in an amount of 0.0003–5 weight per cent based on the normally oxidizable material effective as an anti-oxidant of a hydrocarbon oil-soluble bisphenyl type compound corresponding to the general formula

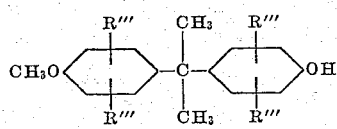

wherein R''' is an alkyl radical having 4 to 10 carbon atoms.

5. A composition as in claim 4 wherein all four R''' radicals of the bisphenyl compound are tertiary butyl groups.

6. A composition as in claim 4 wherein the oxidizable organic hydrocarbon material is a turbine oil.

7. A cracked gasoline composition containing as an inhibitor against oxidative deterioration an oil-soluble bisphenol compound corresponding to the formula

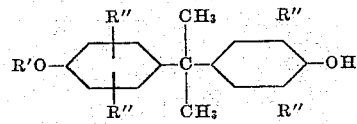

wherein R' is a radical selected from the group consisting of hydrogen and alkyl radicals having 1 to 5 carbon atoms, and R'' is an alkyl radical having 4 to 10 carbon atoms, the bisphenol compound being present in an amount corresponding to about 0.001 to 5 lbs. per 5,000 gallons of gasoline.

8. A cracked gasoline composition containing as an inhibitor against oxidative deterioration an oil-soluble bisphenol compound corresponding to the formula

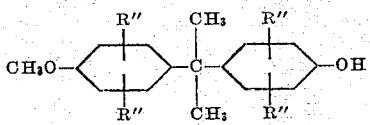

wherein R'' is an alkyl radical having 4 to 10 carbon atoms, the bisphenol compound being present in an amount corresponding to about 0.001 to 5 lbs. per 5,000 gallons of gasoline.

9. A gasoline composition as in claim 8 wherein all four R'' radicals of the bisphenol compound are tertiary butyl groups.

References Cited in the file of this patent

UNITED STATES PATENTS

| Number | Name | Date |
|---|---|---|
| 1,788,529 | Koenigsberger | Jan. 13, 1931 |
| 1,972,599 | Perkins et al. | Sept. 4, 1936 |
| 2,061,779 | Semon | Nov. 24, 1936 |
| 2,248,831 | Stillson et al. | July 8, 1941 |
| 2,482,748 | Dietzler | Sept. 27, 1949 |
| 2,504,064 | Bock et al. | Apr. 11, 1950 |
| 2,504,382 | Bousquet et al. | Apr. 18, 1950 |
| 2,515,906 | Stevens et al. | July 18, 1950 |
| 2,515,907 | Stevens | July 18, 1950 |
| 2,515,908 | Stevens | July 18, 1950 |
| 2,535,015 | Johnson et al. | Dec. 19, 1950 |
| 2,542,972 | Thompson | Feb. 27, 1951 |

FOREIGN PATENTS

| 497,039 | Belgium | Aug. 14, 1950 |